(12) United States Patent
Kang et al.

(10) Patent No.: US 10,368,309 B2
(45) Date of Patent: Jul. 30, 2019

(54) DYNAMIC POWER SAVING MODE AND CONFIGURATION CHANGING BASED ON TRAFFIC PATTERN

(71) Applicant: Avago Technologies International Sales Pte. Limited, Singapore (SG)

(72) Inventors: Hyeoksang Kang, Seoul (KR); Seung Goo Kim, Yongin-si (KR); Sang Ku Lee, Seongnam-si (KR); Heedong Kim, Seoul (KR); Chanphill Yun, Gwacheon-si (KR)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/682,980

(22) Filed: Aug. 22, 2017

(65) Prior Publication Data

US 2018/0288702 A1     Oct. 4, 2018

Related U.S. Application Data

(60) Provisional application No. 62/477,913, filed on Mar. 28, 2017.

(51) Int. Cl.
| | |
|---|---|
| *H04W 52/02* | (2009.01) |
| *H04W 24/08* | (2009.01) |
| *H04L 12/26* | (2006.01) |
| *H04L 12/24* | (2006.01) |
| *H04W 84/12* | (2009.01) |

(52) U.S. Cl.
CPC ..... *H04W 52/0225* (2013.01); *H04L 41/0833* (2013.01); *H04L 43/0882* (2013.01); *H04W 24/08* (2013.01); *H04L 43/16* (2013.01); *H04W 84/12* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/22* (2018.01)

(58) Field of Classification Search
CPC . H04W 52/0225; H04W 52/04; H04W 52/06; H04W 52/225; H04W 52/00; H04W 52/02; H04W 52/0251; H04W 52/0261; H04W 28/221; H04W 24/08; H04W 84/12; H04L 43/16; H04L 1/0044
See application file for complete search history.

(56) References Cited

U.S. PATENT DOCUMENTS

| | | | | |
|---|---|---|---|---|
| 6,047,169 A | * | 4/2000 | Dent | H04W 52/0283 455/127.5 |
| 9,749,975 B2 | * | 8/2017 | Chu | H04W 56/0015 |

(Continued)

*Primary Examiner* — Warner Wong
(74) *Attorney, Agent, or Firm* — Foley & Lardner LLP

(57) ABSTRACT

In some aspects, the disclosure is directed to methods and systems for providing dynamic power saving. A wireless device generates traffic statistics by determining density and periodicity of data traffic with a network. The data traffic is categorized into a first traffic pattern of a plurality of traffic patterns using the generated traffic statistics. The wireless device dynamically selects one of a plurality of predefined power management mechanisms in accordance to the first traffic pattern. The wireless device is configured to use the selected power management mechanism in accordance to the first traffic pattern.

20 Claims, 10 Drawing Sheets

(56) References Cited

U.S. PATENT DOCUMENTS

| | | | |
|---|---|---|---|
| 2003/0211058 A1* | 11/2003 | Matts | A61K 8/25 424/63 |
| 2005/0221869 A1* | 10/2005 | Liu | G06F 1/3209 455/574 |
| 2007/0036096 A1* | 2/2007 | Sinivaara | H04W 52/0229 370/318 |
| 2007/0259673 A1* | 11/2007 | Willars | H04W 52/0225 455/453 |
| 2009/0052372 A1* | 2/2009 | Durazzo | H04W 52/225 370/318 |
| 2009/0201843 A1* | 8/2009 | Wang | H04W 52/0216 370/311 |
| 2010/0016009 A1* | 1/2010 | Andersson | H04W 52/08 455/522 |
| 2010/0231383 A1* | 9/2010 | Levine | H04W 52/0261 340/540 |
| 2011/0069649 A1* | 3/2011 | Gobriel | H04W 52/0232 370/311 |
| 2011/0151944 A1* | 6/2011 | Morgan | H04W 52/0258 455/574 |
| 2012/0076011 A1* | 3/2012 | Gobriel | H04W 52/0258 370/252 |
| 2012/0147802 A1* | 6/2012 | Ukita | H04W 52/0258 370/311 |
| 2014/0105087 A1* | 4/2014 | Gupta | H04B 15/00 370/311 |
| 2014/0149770 A1* | 5/2014 | Ahmad | G06F 1/3228 713/323 |
| 2016/0127997 A1* | 5/2016 | Ang | H04W 52/0216 370/311 |
| 2017/0202015 A1* | 7/2017 | Li | H04W 74/02 |
| 2017/0332327 A1* | 11/2017 | Fang | H04L 5/0007 |

\* cited by examiner

DYNAMIC POWER SAVING MODE AND CONFIGURATION CHANGING BASED ON TRAFFIC PATTERN

CROSS REFERENCE TO RELATED APPLICATIONS

This application claims priority to and the benefit of U.S. Provisional Application No. 62/477,913, filed Mar. 28, 2017, entitled "DYNAMIC POWER SAVING MODE AND CONFIGURATION CHANGING BASED ON TRAFFIC PATTERN", assigned to the assignee of this application, and which is incorporated herein by reference in its entirety for all purposes.

FIELD OF THE DISCLOSURE

The present description relates generally to systems and methods for wireless communication, including but not limited to systems and methods for wireless communication using power saving modes.

BACKGROUND OF THE DISCLOSURE

Wireless local area network (WLAN) communication system generally supports an active mode and a power saving mode as an operation mode of a station (STA). The active mode enables the STA to operate in a wake state capable of transmitting and receiving communication packets. The power saving mode is for operation under reduced power and enables the STA to be in a doze state. Under the power saving mode, the STA may not have to wake up to receive communication packets.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following standard(s) and specification(s), including any draft versions of such standard(s) and specification(s), are hereby incorporated herein by reference in their entirety and are made part of the present disclosure for all purposes: Long-Term Evolution (LTE): NAN 3GPP; and IEEE 802.11. Although this disclosure can reference aspects of these standard(s) and specification(s), the disclosure is in no way limited to these aspects.

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for providing dynamic power saving.

A. Computing and Network Environment

Figure 1A:
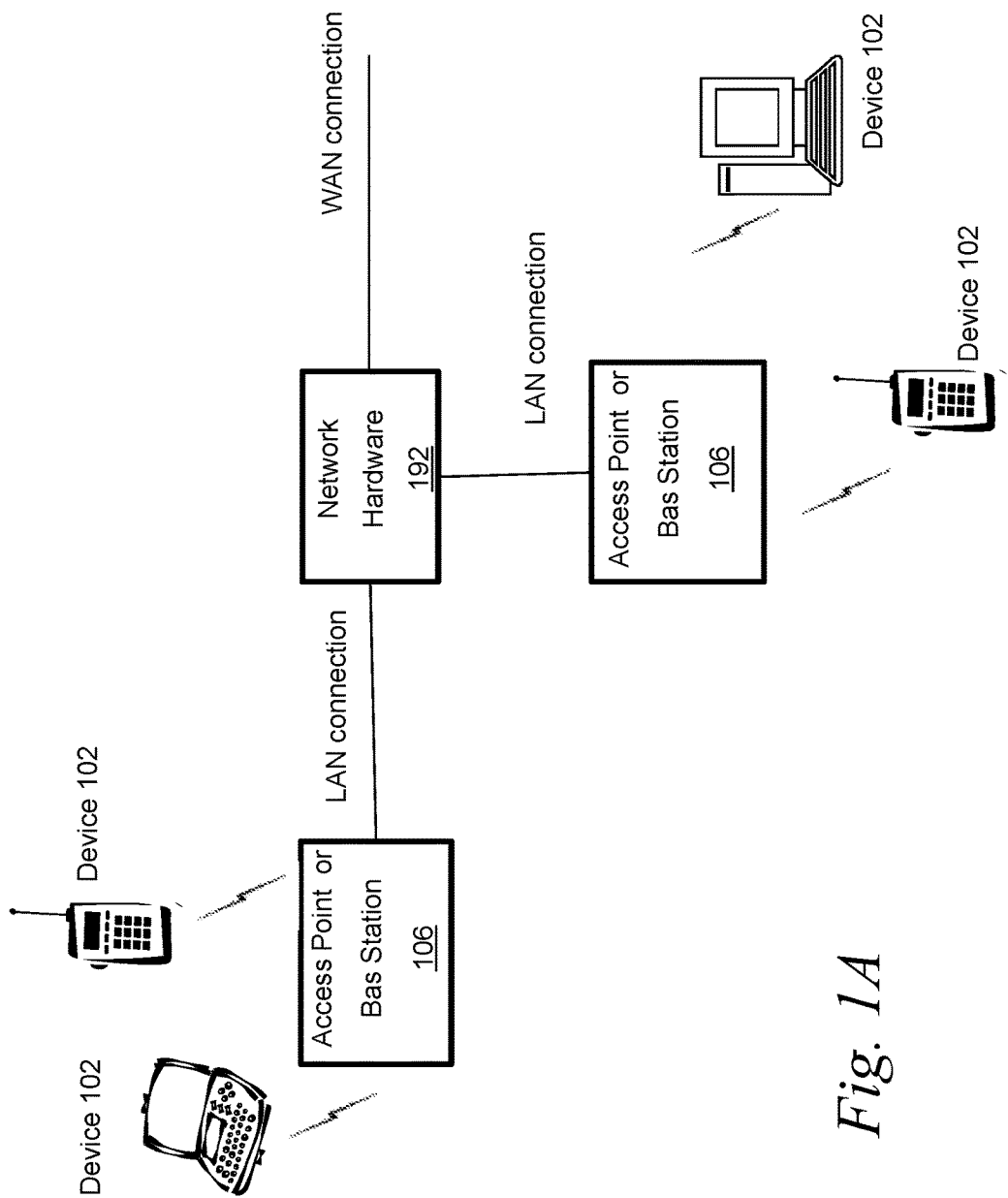
FIG. 1A is a block diagram depicting an embodiment of a network environment including one or more wireless communication devices in communication with one or more devices or stations.

Prior to discussing specific embodiments of the present solution, aspects of the operating environment as well as associated system components (e.g., hardware elements) are described in connection with the methods and systems described herein. Referring to FIG. 1A, an embodiment of a network environment is depicted. In brief overview, the network environment includes a wireless communication system that includes one or more base stations 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or base station are described in greater detail with reference to FIGS. 1B and 1C. The network environment can be an ad hoc network environment, an infrastructure wireless network environment, a subnet environment, etc., in one embodiment.

Terms such as "wireless communication device", "user equipment," "mobile station," "mobile," "mobile device," "subscriber station," "subscriber equipment," "access terminal," "terminal," "user device," "user terminal," "handset," and similar terminology, can refer to a wireless device utilized by a subscriber or user of a wireless communication service to receive or convey data, control, voice, video, sound, gaming, or substantially any data-stream or signaling-stream. The foregoing terms can be utilized interchangeably in the present disclosure. Likewise, terms such as "access point (AP)," "wireless access point (WAP)," "base station," "base transceiver station", "Node B." "evolved Node B (eNode B or eNB)." home Node B (HNB)," "home access point (HAP)," and similar terminology, can be utilized interchangeably in the present disclosure, and refer to a wireless network component or apparatus that serves and receives data, control, voice, video, sound, gaming, or substantially any data-stream or signaling-stream from a set of wireless devices.

Referring again to FIG. 1A, the base stations 106 can be operably coupled to the network hardware 192 via local area network connections. The network hardware 192, which can include a router, gateway, switch, bridge, modem, system controller, appliance, etc., can provide a local area network connection for the communication system. Each of the base stations 106 can have an associated antenna or an antenna array to communicate with the wireless communication devices 102 in its area. The wireless communication devices 102 can register with a particular access point 106 to receive services from the communication system (e.g., via a SU-MIMO or MU-MIMO configuration). For direct connections (e.g., point-to-point communications), some wireless communication devices 102 can communicate directly via an allocated channel and communications protocol. Some of the wireless communication devices 102 can be mobile or relatively static with respect to the access point 106.

In some embodiments, a base station 106 includes a device or module (including a combination of hardware and software) that allows wireless communication devices 102 to connect to a wired network using LTE, Wi-Fi, and/or other standards. A base station 106 can be implemented, designed and/or built for operating in a wireless local area network (WLAN), or in a cellular network. A base station 106 can connect to a router (e.g., via a wired network) as a standalone device in some embodiments. In other embodiments, a base station can be a component of a router. A base station 106 can provide multiple devices 102 access to a network. A base station 106 can, for example, connect to a wired Ethernet connection and provide wireless communications using radio frequency links for other devices 102 to utilize that wired connection. A base station 106 can be built and/or implemented to support a standard for sending and receiving data using one or more radio frequencies. Those standards and the frequencies they use can be defined by the IEEE or 3GPP for example. A base station 106 can be implemented and/or used to support cellular coverage, public Internet hotspots, and/or on an internal network to extend the network's signal (e.g., Wi-Fi) range.

In some embodiments, the base stations 106 can be used for (e.g., in-home or in-building) wireless networks (e.g., IEEE 802.11, Bluetooth, ZigBee, cellular, any other type of radio frequency based network protocol and/or variations thereof). Each of the wireless communication devices 102 can include a built-in radio and/or is coupled to a radio. Such wireless communication devices 102 and/or base stations 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more base stations 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
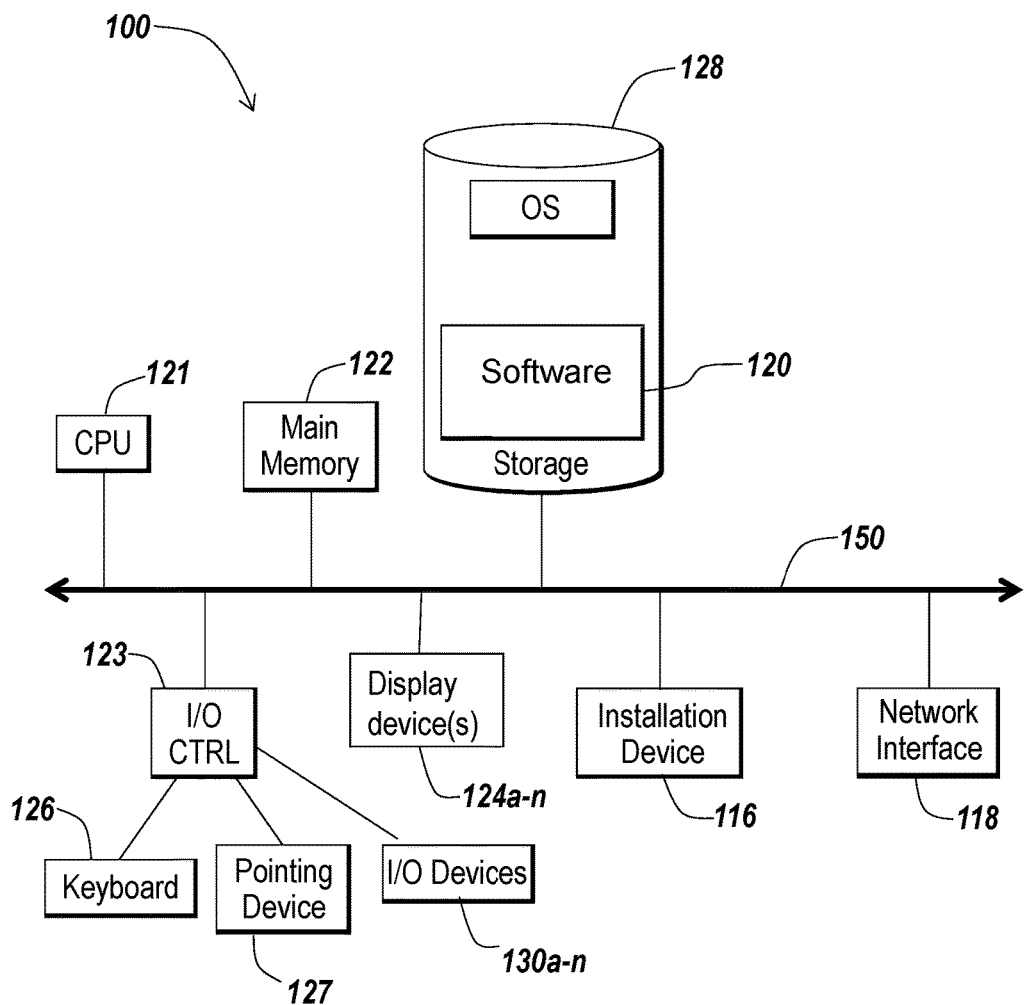
FIGS. 1B and 1C are block diagrams depicting embodiments of computing devices useful in connection with the methods and systems described herein.
Figure 1C:
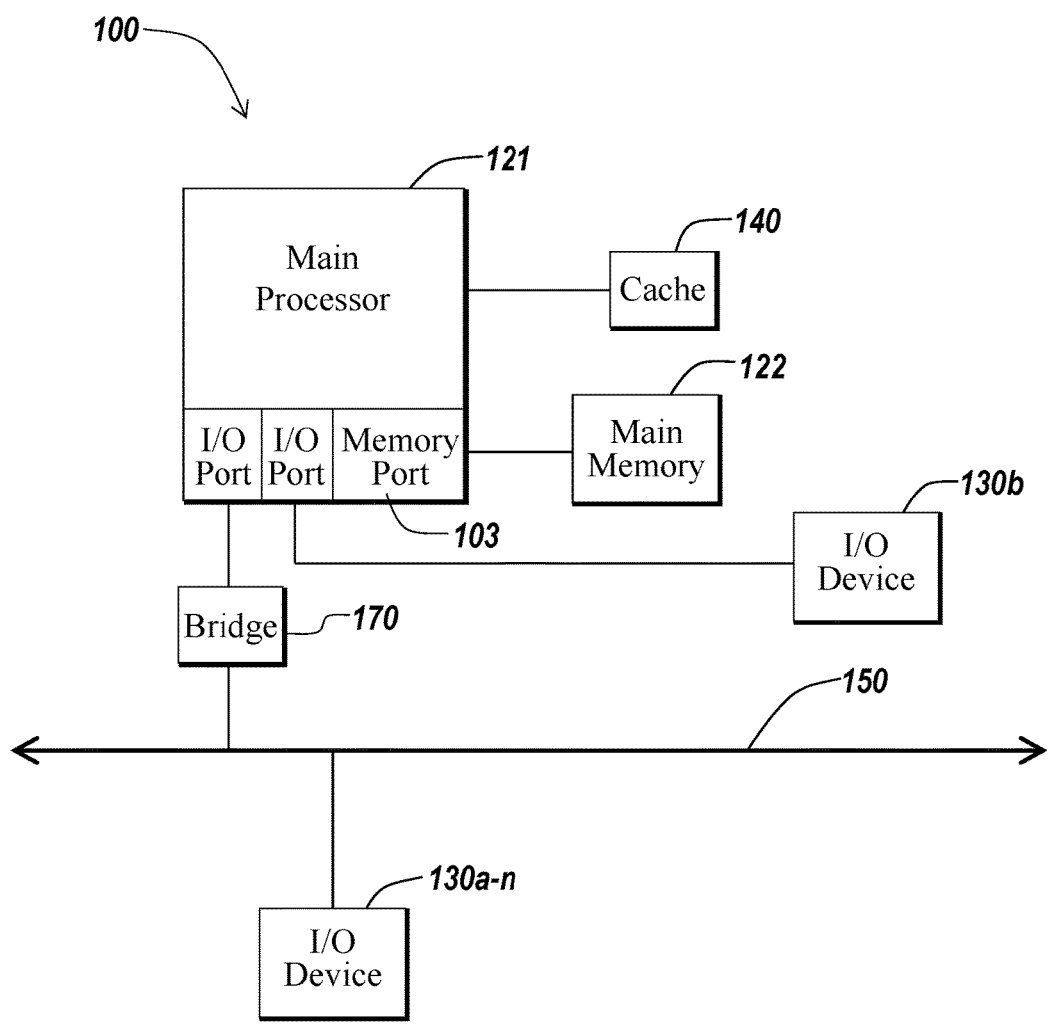

The communications device(s) 102 and base station(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or the base station 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include, without limitation, an operating system and/or software. As shown in FIG. 1C, each computing device 100 can also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by International Business Machines of White Plains, N.Y.; those manufactured by ARM Holdings, plc of Cambridge, England. or those manufactured by Advanced Micro Devices of Sunnyvale, Calif. The computing device 100 can be based on any of these processors, or any other processor capable of operating as described herein.

Main memory unit 122 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 122 can be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is provided by, for example, SRAM, BSRAM, or EDRAM. In the embodiment shown in FIG. 1C, the processor 121 communicates with various I/O devices 130a-n via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 131 directly.

A wide variety of I/O devices 130a-n and 131 can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices 130a-n can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11 lad, CDMA, GSM, WiMax, LTE, LTE-A and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be implemented for using multiple displays 124a-124n. One ordinarily skilled in the art will recognize and appreciate the various ways and embodiments that a computing device 100 can be implemented to have one or more display devices 124a-124n.

In further embodiments, an I/O device 130a-n can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, sensor, desktop computer, laptop or notebook computer, server, handheld computer, mobile telephone, or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Dynamic Power Saving

A power saving mechanism is conventionally designed for a burst-based traffic pattern and/or highest throughput. The conventional power saving mechanism is suitable for high throughput burst traffic such as the case of a file download, but fails to provide suitable power savings at various user scenarios such as voice/video call, web browsing, etc. The conventional power saving mechanism usually consumes power at a relatively fixed level, and cannot dynamically optimize its performance for all applications. For example, one power saving mechanism may be designed for efficient power utilization for video streaming, but this power saving mechanism may not provide sufficient power saving efficiency for a voice call.

The present disclosure describes various methods and systems for providing dynamic power saving for a communication system. In one or more embodiments, the dynamic power saving solution(s) disclose herein enables the communication system to dynamically switch between different power saving mechanisms according to real-time, past and/or projected traffic patterns. In one or more embodiments, the dynamic power saving solution(s) disclosed herein also enables the communication system to dynamically balance between power saving and wireless communication performance, and improve power saving efficiency in various communication scenarios. In one or more embodiments, the communication system (e.g., a UE) monitors communication traffic and/or the type and level of processing (e.g., in real time), and analyzes the traffic packets' pattern (e.g., packet density/count and/or periodicity) during a period of time. In one or more embodiments, the communication system further determines, projects or estimates, via polling or otherwise, information about upcoming traffic (e.g., in real time).

Figure 2A:
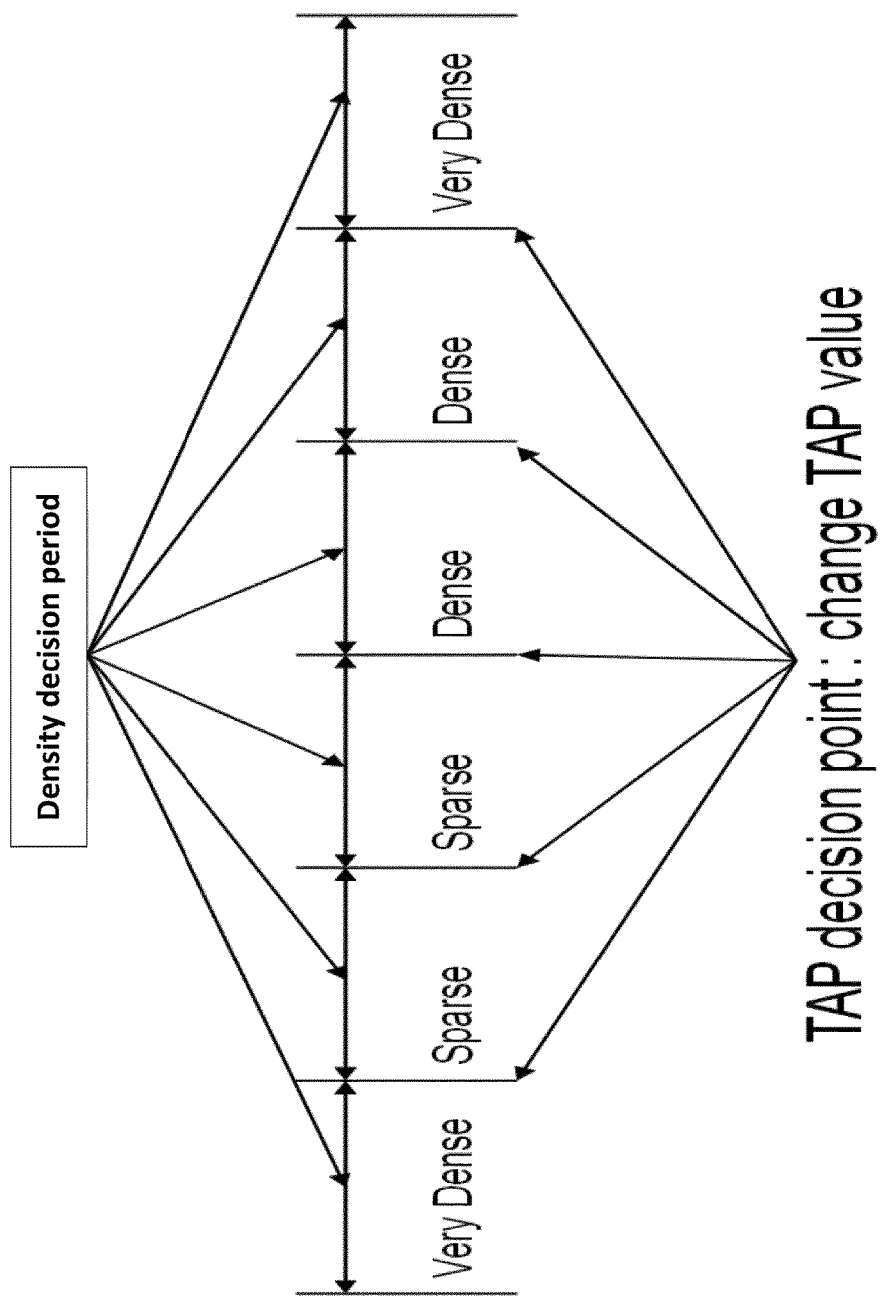
FIG. 2A depicts an example embodiment of a traffic density determination algorithm.
Figure 2B:
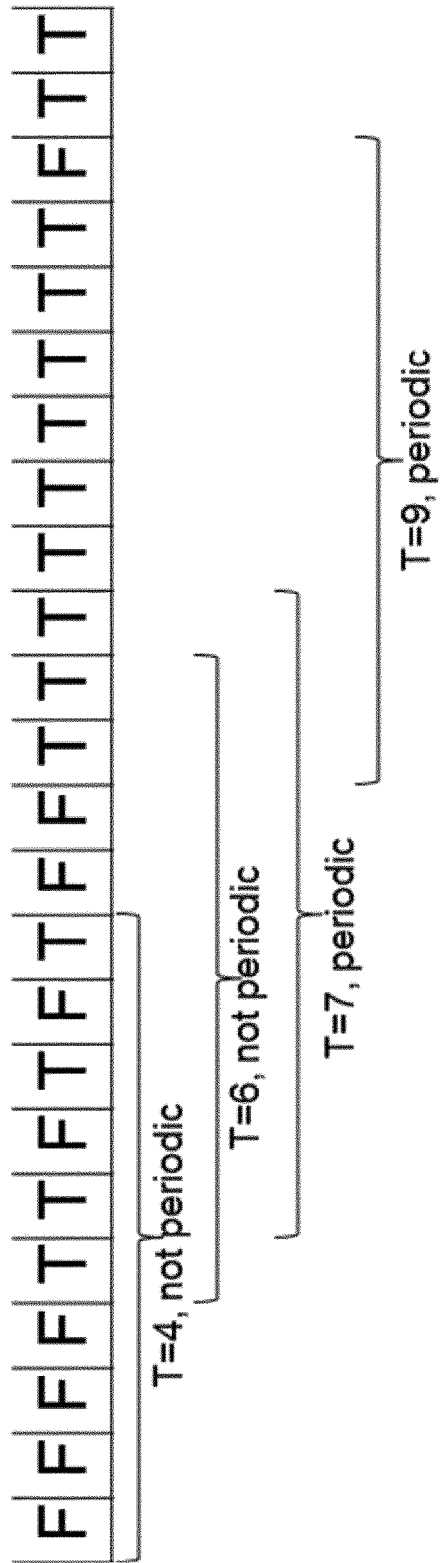
FIG. 2B depicts an example embodiment of a traffic periodicity determination algorithm.

Referring to FIG. 2A and FIG. 2B, an example embodiment of a traffic pattern determination algorithm is depicted. In one or more embodiments, a communication device (e.g., a station, a user equipment, a wireless device) adapted for dynamic power saving monitors traffic of the communication device and determines a traffic pattern during a specific time. In one or more embodiments, the traffic pattern includes traffic density and/or traffic periodicity. In one or more embodiments, the traffic density refers to a count of packets or communications handled by the communication device over a specified time. In one or more embodiments, the traffic periodicity refers to any periodic or cyclic characteristic in traffic, such as instances/occurrence of packet transmissions and/or reception over time, transmission and/or reception power over time, packet density/count over time, and/or change in traffic statistics (sum, average, minimum and/or maximum packet counts/density, standard deviation) over time.

As shown in FIG. 2A, an example embodiment of a traffic density determination sequence (e.g., as determined or performed by an algorithm) is depicted. In one or more embodiments, the communication device determines a traffic density by counting a total number of packets transmitted to/from the communication device for or over a density decision period. In one or more embodiments, the density decision period is predetermined. In one or more embodiments, the communication device estimates a traffic absence period (TAP) during the predetermined density decision period, e.g., according to the traffic density variation or changes in that period of time. In one or more embodiments, there are multiple TAP decision points for determining whether the value of TAP should change or be maintained, each corresponding to (at least one boundary of) each period being analyzed. For example, the communication device counts a total number of packets for a period of 100 ms to determine a density, and for instance determines that within the 100 ms, there is no traffic for 20 ms. In one or more embodiments, the TAP is set according to the time during which traffic is absent (e.g., 20 ms), and/or according to the density of the traffic. In one or more embodiments, the communication device enters doze state/mode if there are no packets during a time period corresponding to the value set/decided for TAP.

As shown in FIG. 2B, an example embodiment of traffic periodicity determination according to a dynamic power saving algorithm is depicted. In one or more embodiments, the communication device determines multiple periodic decision periods and a first periodic decision criteria for each periodic decision period. In one or more embodiments, the periodic decision period represents a period of time during which the communication device monitors the communication traffic for determining a periodicity of the communication traffic. In one or more embodiments, the periodic decision criteria represents a threshold that is compared against certain traffic statistics of the communication device according to a respective periodic decision period.

In one or more embodiments, the traffic periodicity is determined by monitoring the traffic at the communication device for several (e.g., consecutive) periodic decision periods (e.g., 10 periods of 100 ms). In one or more embodiments, the communication device marks a particular periodic decision period (e.g., as TRUE or T) if the packets identified/counted within that period (or other traffic statistics) meet the periodic decision criteria. In one or more embodiments, the communication device marks another periodic decision period differently (e.g., as FALSE or F) if the number of packets identified/counted within that other period fails to meet the periodic decision criteria.

In one or more embodiments, a number of time windows spanning several periodic decision periods are defined (e.g., each spanning 10 periodic decision periods). In one or more embodiments, each time window overlaps with another time window over one or more periodic decision periods. Within each time window, the communication device counts a total number of periods that are marked as T for instance, and determines whether the total number exceeds a second predetermined periodic decision threshold or criteria (e.g., 7 T's per 10 periods). If the total number of periods marked as T within a time window exceeds the second predetermined periodic decision threshold or criteria, the traffic in the time window is determined as being periodic. If the total number within a time window is below the second predetermined periodic threshold or criteria, that time window is determined as being not period, in one or more embodiments.

In one or more embodiments, there are multiple power saving mechanisms that allows a wireless device to save power in corresponding one or more communication scenarios. In one or more embodiments, the dynamic power saving disclosed herein enables a wireless device to determine traffic patterns for each communication scenario in real-time and dynamically switch between the multiple power saving mechanisms according to the determined traffic patterns.

In some embodiments, the multiple power saving mechanisms supported by the wireless device includes four power saving mechanisms as shown in the following Table A, Table B, and Table C for instance.

TABLE A

| PM Mechanism | Basic operation | Configuration Field |
| --- | --- | --- |
| PM-First | Concept<br>STA is in Power Save mode always, and exchanges packets in Power Save mode<br>Data Trnnsmission from STA<br>STA can send data any time if it has data to send<br>How to Inform to STA when AP has buffered data for STA<br>AP informs the existence of data to STA using TIM IE of beacon at DTIM or more data bit of transmitted packet<br>When AP send data?<br>AP can send data only when STA queries the existence of packet (currently PS-Poll is used for the query packet)<br>Mode switch time to Active mode<br>Does not switch to Active mode at this PM Mechanism. | Sending Query Frame (PS-Poll) Interval |
| PM-Second | Concept<br>STA is in Power Save mode if there are no data transaction, and switches to active mode to exchange packet<br>STA switches from Active mode to Power Save mode if there are no data transaction for Traffic Absence Period<br>Data Transmission from STA<br>STA can send data any time if it has data to send<br>How to Inform to STA when AP has buffered data for STA<br>AP informs the existence of data to STA using TIM IE of beacon at DTIM or more data bit of transmitted packet<br>When AP send data?<br>AP can send data only when STA is in Active mode<br>Mode switch time to Active mode<br>If AP informs that the existence of packet via beacon<br>If STA has data to send<br>Mode switch time to Power Save mode<br>If there is no traffic during Traffic Absence Period | Traffic Absence Period |

TABLE B

| PM Mechanism | Basic operation | Configuration Field |
| --- | --- | --- |
| WMM-PS | Concept<br>S-APSD: STA is switching between Doze state and Awake state by negotiated Awake Period and Service Period<br>U-APSD: STA switches to Awake state having exchange packet by trigger frame and enter to Doze state after Service Period<br>Data Transmission from STA<br>STA can send data any time if it has data to send<br>How to Inform to STA when AP has buffered data for STA<br>AP has no manner to inform the existence of packets to STA<br>When AP send data?<br>AP can send data when STA queries the existence of packet to AP (currently QoS data or QoS Null data is used for the query packet)<br>AP can send data when getting to have scheduled awake time<br>When STA enter to Awake state?<br>If STA has data to send<br>If STA gets to have Scheduled Awake time<br>When STA enter to Doze state?<br>If STA receives the End of Service Period(EOSP) bit marked frame from AP<br>After a configured Service Period<br>Information<br>This mechanism is introduced by IEEE 802.11E spec. | Scheduled and Unscheduled Awake Period, Service Period and so on |
| TWT(Target Wake Time) | Concept<br>STA is switching between Doze state and Awake state by negotiated Target Awake Period and Wake Interval<br>Data Transmission from STA<br>STA can send data only in negotiated awake period (active state)<br>How to Inform to STA when AP has buffered data for STA<br>AP has no manner to inform the existence of packets to STA<br>When AP send data?<br>AP can send data only in negotiated awake period (active state) | Target Awake Period, Wakeup Interval and so on |

TABLE B-continued

| PM Mechanism | Basic operation | Configuration Field |
|---|---|---|
| | When STA enter to Awake state? Every negotiated Target Awake Period When STA enter to Doze state? After wakeup interval from Target Awake Period Information This mechanism is introduced by IEEE 802.11AH spec and also includes at IEE 802.11AX spec. | |
| NEW PM Mechanism | Possible to add new power save mechanism introduce by IEEE | |

TABLE C

| PM Mechanism | Configuration Field | Configured value | Efficiency | |
|---|---|---|---|---|
| | | | Data exchange (Latency, Jitter, Robustness, Throughput) | Current Consumption |
| PM-First | Sending Query Frame(PS-Poll) Interval | Long interval | Poor | Good |
| | | Short interval | Good | Poor |
| PM-Second | Traffic Absence Period | Long duration | Good | Poor |
| | | Short duration | Poor | Good |
| WMM-PS | Scheduled and Unscheduled Awake Period | Long interval | Poor | Good |
| | | Short interval | Good | Poor |
| | Service Period | Long duration | Good | Poor |
| | | Short duration | Poor | Good |
| TWT | Target Awake Period | Long duration | Poor | Good |
| | | Short duration | Good | Poor |
| | Wakeup Interval | Long interval | Good | Poor |
| | | Short interval | Poor | Good |

Under a first power saving mechanism (e.g., PM1), the wireless device stays in a doze state, in one or more embodiments. The wireless device wakes up when the wireless device has one or more packets to send, or receives a beacon from an access point (AP) indicating that there are packets buffered at the AP for transmission to the wireless device, according to one or more embodiments. Upon receiving the beacon which indicates availability of packets, the wireless device wakes up and sends a PS-POLL packet to the AP to permit reception of traffic from the AP, in one or more embodiments. In one or more embodiments, the wireless device goes back to the doze state if there are no more packets ready for transmission and/or reception. While in the doze state, the wireless device receives one or more beacons from the AP, according to one or more embodiments. If the beacon includes a traffic indication map (TIM), the wireless device wakes up or remains in the doze state, and sends a PS-POLL packet to the AP to check for existence of packets (e.g., that are ready to transmit) at the AP, in one or more embodiments.

Under a second power saving mechanism (e.g., PM2) for instance, the wireless device switches between a power save mode and an active mode in some embodiments. In one or more embodiments, the wireless device enters into or operates according to a power save mode if there has been no traffic for a long time (e.g., beyond a predefined length of time). The wireless device monitors a traffic absence period (TAP) indicating a period of time during which there is no traffic at the wireless device, in one or more embodiments. The wireless device further compares the TAP with one TAP threshold values, in one or more embodiments. If the wireless device exceeds a predetermined TAP threshold, the wireless device goes to a power save mode in one or more embodiments. In one or more embodiments, the TAP threshold is 200 ms, for instance. The wireless device informs its mode—whether a power save mode or an active mode—to the AP using NULL-Data frame in one or more embodiments. The AP transmits data to the wireless device which is in an active mode and the wireless device sends data to the AP if it has data to send, in one or more embodiments.

Under a third power saving mechanism (e.g., WMM-PS) for instance, the wireless device switches between a doze state and a wake-up state, in one or more embodiments. In one or more embodiments, the wireless device switches to an awake state upon sending a trigger frame for exchanging packets and switches back to the doze state upon receiving the finishing packet or after scheduled awake period (e.g., U-APSD). Or the wireless device switches between awake state and doze state by negotiated awake period and service period with the AP (e.g., S-APSD). The wireless device sends data any time if it has data to send, according to one or more embodiments. The AP does not transmit any information indicating whether there is data for transmission buffered in an AP for the wireless device, according to one or more embodiments. In one or more embodiments, the AP transmits informs the wireless device when the AP receives requires from the wireless device requesting information indicating existence of packets at the AP or the AP switches to awake state according to an awake time schedule.

Under a fourth power saving mechanism (e.g., TWT—target wake time), the wireless device switches between doze state and awake state by a negotiated target awake period and a wake interval. In one or more embodiments, the wireless device enters into awake state and sends data (e.g., only) in the negotiated awake period. In one or more embodiments, when an AP has data buffered for transmission to the wireless device, the AP has no manner to inform the existence of data to the wireless device. In one or more embodiments, the AP sends data only in the negotiated awake period. In one or more embodiments, the wireless device enters into doze state after each wakeup interval from the target awake period.

Figure 2C:
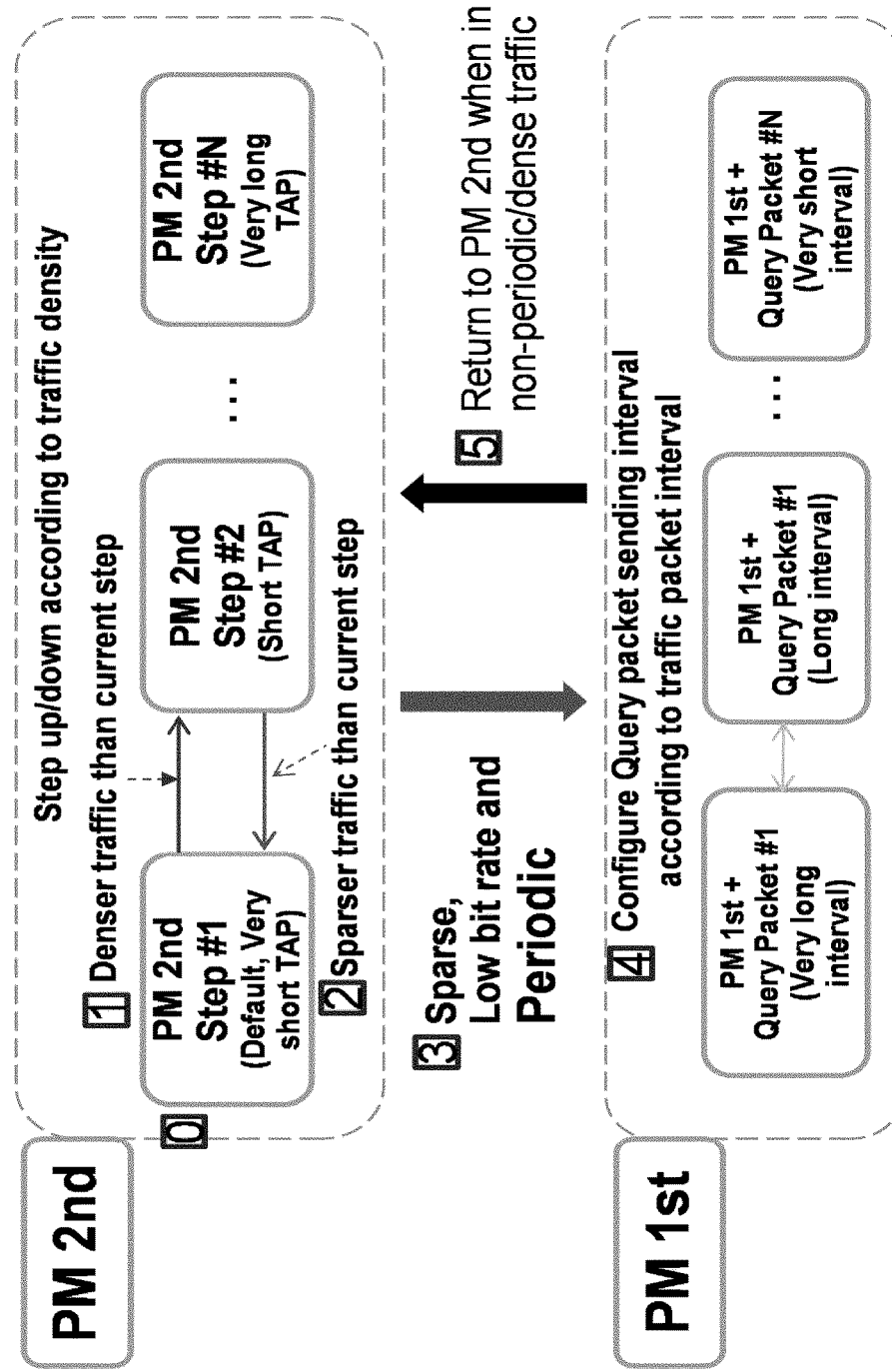
FIG. 2C depicts an example embodiment of a dynamic power saving implementation.

Referring to FIG. 2C, an example embodiment of a dynamic power saving implementation is depicted. In one or more embodiments, a wireless device is under the second power mechanism (e.g., PM2) as a default or at a certain point in time. In one or more embodiments, the wireless device determines a current TAP utilized in the current PM2. In one or more embodiments, the wireless device monitors a traffic density for the traffic in real-time. In one or more embodiments, upon determining a traffic density is larger than a prior traffic density, the wireless device increases the TAP. In one or more embodiments, upon determining a traffic density is less than a prior traffic density, the wireless device decreases the TAP. For example, as shown in FIG. 2C, the wireless device operates at a default PM2 with a very short TAP at step 0. When the wireless device determines the traffic is denser than previous traffic at step 1, the wireless device increases the TAP to a short TAP. Similarly, the wireless device increases the TAP sequentially from very short TAP, short TAP . . . to very long TAP corresponding to the increasing traffic density. When the wireless device determines that the traffic is sparser than a previous traffic at step 2, the wireless device decreases the short TAP to a very short TAP, for instance.

In one or more embodiments, the wireless device also determines a traffic periodicity while monitoring the traffic density. In one or more embodiments, the wireless device determines whether a current traffic is periodic. In one or more embodiments, when the traffic is determined as being periodic and being sparse with a low traffic density (e.g., traffic density is below a predetermined traffic density threshold), the wireless device switches from the second power saving mechanism (e.g., PM2) to the first power saving mechanism (e.g., PM1) at step 3. In one or more embodiments, when the wireless switches to first power saving mechanism, the wireless device continuously monitors the traffic pattern by determining the traffic periodicity and traffic density. In one or more embodiments, while under the first power saving mechanism, the wireless device determines a query packet (e.g., PS-POLL) sending interval according to a current traffic packet interval to reduce latency. For instance, if the predetermined interval is set at 100 ms, this could lead to a long or significant latency in transmission of data between the wireless device and the AP. In one or more embodiments, such latencies cause low voice quality in voice applications for instance. For example if the latency exceeds a predetermined latency threshold (e.g., 100 ms), it causes low (e.g., voice or video) quality. In one or more embodiments, while in the doze state, the wireless device sends PS-POLL packets periodically to the AP to check if there are packets ready for transmitting from the AP to the wireless device regardless of a TIM (e.g., regardless of whether a TIM is received or not). In one or more embodiments, the wireless device adjusts the query packet sending interval according to a real-time traffic packet interval. In one or more embodiments, when the wireless device determines the traffic being not periodic and being dense (e.g., the traffic density increases), the wireless device switches from the first power saving mechanism to the second power saving mechanism.

Figure 2D:
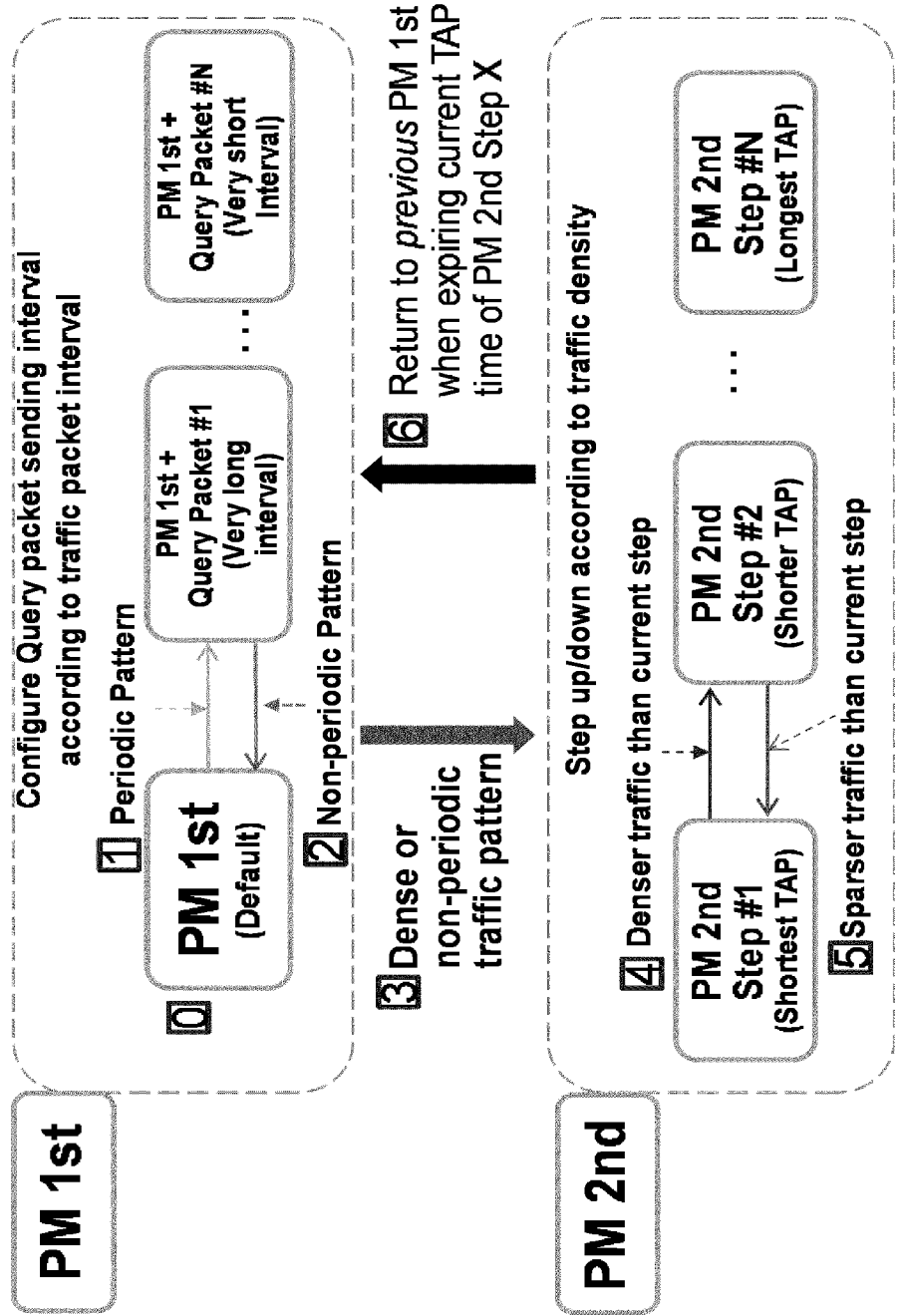
FIG. 2D depicts another example embodiment of a dynamic power saving implementation.

Referring to FIG. 2D, another example embodiment of a dynamic power saving implementation is depicted. In one or more embodiments, a wireless device is under the first power mechanism (e.g., PM1) as a default or at a certain point in time at step 0. In one or more embodiments, the wireless device continuously monitors a traffic pattern in real-time by determining a traffic periodicity and a traffic density for the current traffic. In one or more embodiments, when the wireless device determines the traffic as being periodic, the wireless device determines a query packet sending interval according to a current traffic packet interval at step 1 to reduce latency. In one or more embodiments, the wireless device adjusts the query packet sending interval according to a real-time traffic packet interval. In one or more embodiments, when the wireless determines the traffic as being not periodic and as being dense (e.g., the traffic density is above a predetermined traffic density threshold), the wireless device switches from the first power saving mechanism to the second power saving mechanism at step 3.

In one or more embodiments, upon switching to the second power saving mechanism, the wireless device continuously monitors the traffic pattern and determines the traffic density for the current traffic. In one or more embodiments, the wireless device determines a current TAP utilized in the second power saving mechanism. In one or more embodiments, upon determining a traffic density is less than a prior traffic density, the wireless device decreases the TAP. For example, as shown in FIG. 2D, the wireless device has a default PM2 with a very short TAP at step 0. When the wireless device determines the traffic is denser than a previous traffic at step 1, the wireless device increases the TAP to a short TAP for instance. Similarly, the wireless device increases the TAP in sequence from very short TAP, short TAP, . . . to very long TAP along with the increasing traffic density. When the wireless device determines that the traffic is sparser than a previous traffic at step 2, the wireless device decreases the short TAP to a very short TAP.

Figure 2E:
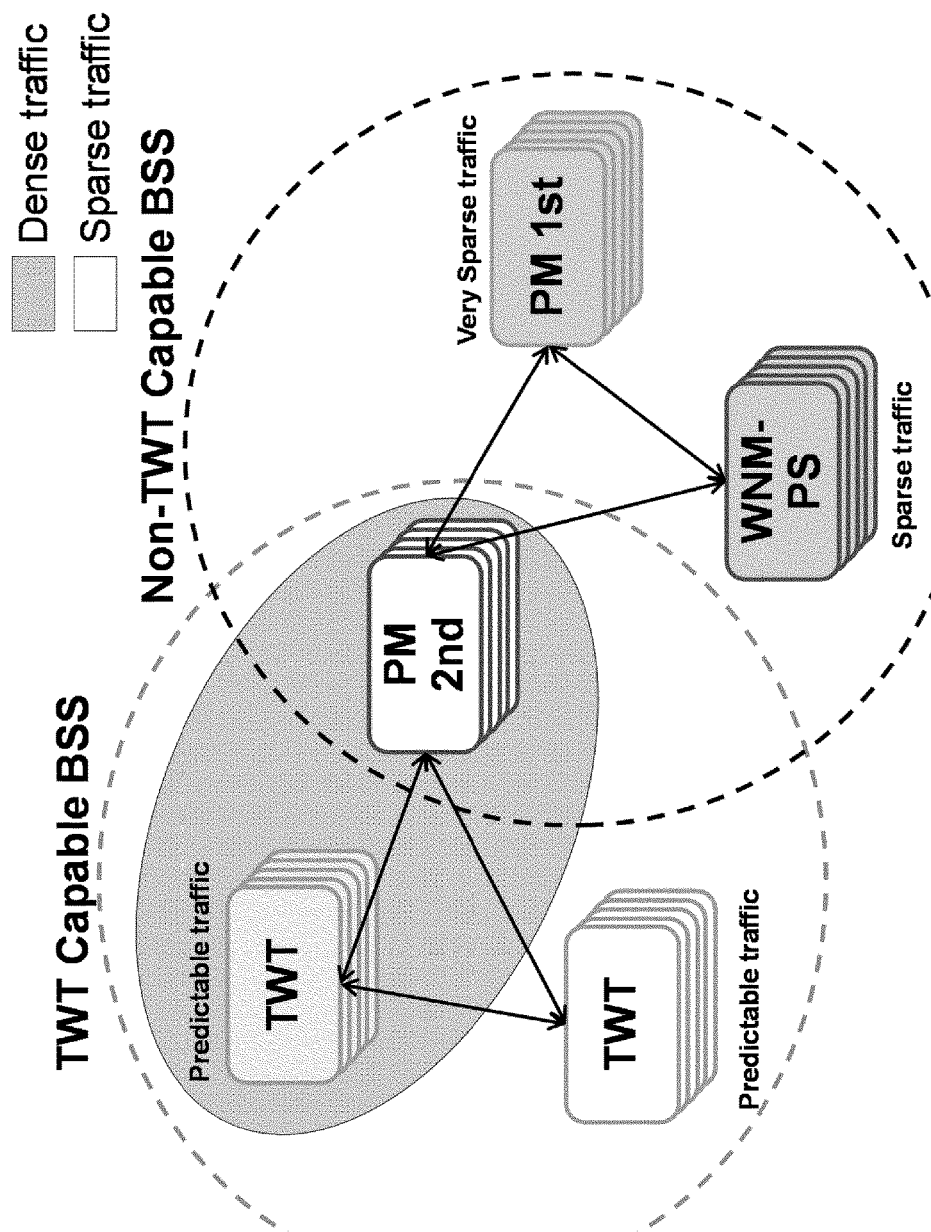
FIG. 2E depicts another example embodiment of a dynamic power saving implementation.

Referring to FIG. 2E, another example embodiment of a dynamic power saving implementation is depicted. In one or more embodiments, a wireless device determines whether a TWT power saving mechanism is supported. In one or more embodiments, upon determining that the wireless device supports the TWT power saving mechanism, as shown in FIG. 2E, being within a TWT capable basic service set (BSS), the wireless device determines a traffic pattern for the real-time traffic. The traffic pattern is determined by calculating traffic statistics as discussed above according to one or more embodiments. Within the TWT capable BSS, the wireless device switches between different power saving mechanisms using the calculated traffic statistics according to one or more embodiments. In one or more embodiments, the wireless device negotiates with an access point based on the traffic statistics, and switches from a power saving mechanism (e.g., TWT) within the TWT BSS to a power saving mechanism (e.g., PM2) within the non-TWT BSS using one or more actions frames to trigger the switch.

Figure 2F:
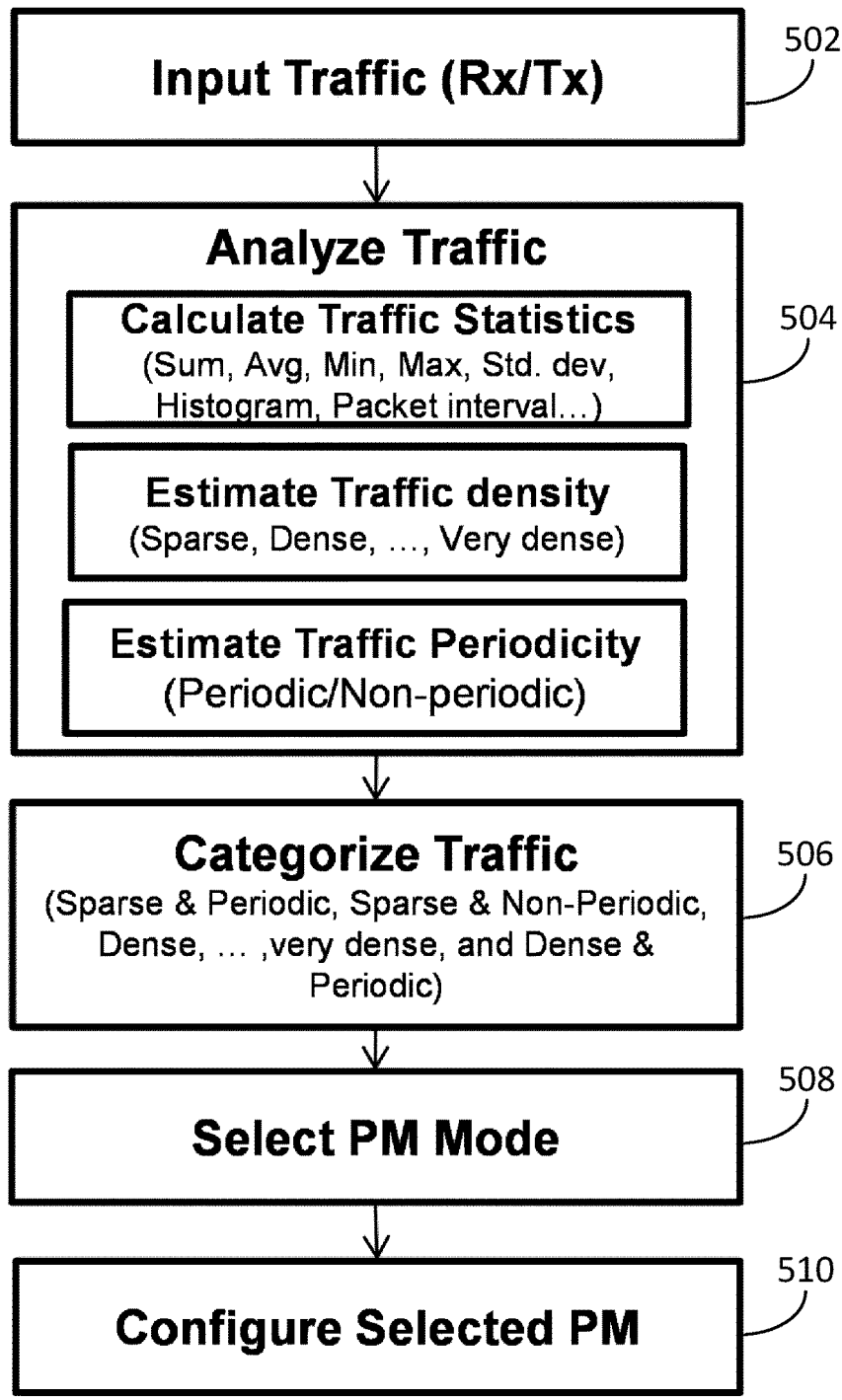
FIG. 2F depicts a flow chart of a method for providing dynamic power saving according to an example embodiment.

Referring to FIG. 2F, a flow chart of a method for providing dynamic power saving is depicted according to an example embodiment. In one or more embodiments, the method includes receiving traffic input by a wireless device (operation 502), analyzing traffic (operation 504), categorizing the analyzed traffic (operation 506), selecting a power saving mechanism based on the category of the traffic (operation 508), and configuring the selected power saving mechanism (operation 510).

At operation 502, a wireless device receives real-time traffic data including any communication packets transmitted to and from the wireless device in real-time according to one or more embodiments. In one or more embodiments, the wireless device receives traffic data including any communication packets transmitted to and from the wireless device over a period of time.

At operation 504, the wireless device analyzes the received traffic data by generating or calculating traffic statistics, estimating traffic density, and/or estimating traffic periodicity according to one or more embodiments. In one or more embodiments, calculating the traffic statistics includes calculating a sum or total count of packets transmitted to and/or from the wireless device over a predetermined period of time. In one or more embodiments, calculating the traffic statistics includes calculating an average data rate by counting packets transmitted over multiple periods of time. In one or more embodiments, calculating the traffic statistics uses various mathematical/statistical expressions or parameters, such as sum, average (e.g., mean, median), minimum and/or maximum throughput, standard deviation, packet latency, histogram, packet interval. In one or more embodiments, the wireless device determines a traffic density (e.g., sparse, dense, or levels thereof) using the calculated traffic statistics. In one or more embodiments, the wireless device determines a traffic periodicity (e.g., periodic, non-periodic) using the calculated traffic statistics. In one or more embodiments, analyzing traffic includes, but is not limited to determining number of packets per predetermined period, determining number of data bytes received and/or transmitted per predetermined period, determining intervals between packets, determining average packet length, determining peak and/or minimum traffic rate(s). In one or more embodiments, the traffic being analyzed includes at least one of the incoming data or outgoing data.

At operation 506, the wireless device categorizes the analyzed traffic according to the calculated traffic density and traffic periodicity according to one or more embodiments. In one or more embodiments, the wireless device compares the traffic density with a traffic density threshold. If the traffic density is below the traffic density threshold, the traffic is determined as being sparse. If the traffic density is above the traffic density threshold, the traffic is determined as being dense. In one or more embodiments, various levels of denseness or sparseness are determined according to predetermined ranges or thresholds. In one or more embodiments, the wireless device determines multiple traffic categories such as sparse&periodic, sparse&non-periodic, dense, very dense, and dense&periodic. In one or more embodiments, the wireless device assigns the current traffic to a corresponding category using the traffic density and traffic periodicity. In one or more embodiments, the wireless device determines the category or type of traffic (e.g., web browsing, voice call, video call, live streaming, video on demand, large file download) being communicated, according to the traffic statistics, traffic density and/or traffic periodicity. In one or more embodiments, the wireless device determines the category or type(s) of traffic being communicated without any application(s) (e.g., web browser, video player) in the wireless device informing the wireless device of the type(s) of traffic being communicated.

At operation 508, the wireless device selects a power saving mechanism/mode based on the category associated with the traffic. For example, if the traffic is categorized as dense, the wireless device selects the second power saving mechanism according to one or more embodiments. If the traffic belongs sparse traffic category, the wireless device selects the first power saving mechanism. In one or more embodiments, Table D shows an example for power saving mechanism selection.

TABLE D

| Application | PM2 Step #N | PM2 Step #1 | PM1 | PM1 + Query Packet #1 |
|---|---|---|---|---|
| Web Browsing | 81.58 | 32.34 | *30.75 | 49.52 |
| Voice Call | 196.65 | 63.785 | 25.11 | *[1]47.60 |
| (Latency) | (0.141) | (2.317) | (31.017) | (1.809) |
| Video Call | 202.00 | 145.00 | 76.37 | *[1]84.70 |
| (Latency) | (0.700) | (0.256) | (10.189) | (6.931) |
| Live Stream | 107.26 | *41.77 | 58.91 | 86.84 |
| VOD | 53.30 | *23.65 | 40.99 | 52.93 |
| 1GB File Download | *287.45 | 278.44 | 260.37 | 263.30 |
| (Download Time) | (23.16sec) | (31 sec) | (322 sec) | (320 sec) |

[1]Best PM mode based on not only power consumption but also latency.
Bold Text: worst results of specific application.
Underlined Text: best results of specific application.

Table D illustrates power efficiency for different power saving mechanisms on different user application scenarios according to one or more embodiments. The table cells with "*" illustrate the best power saving mechanism that has best efficiency and performance for the corresponding application. For example, for Web Browsing, PM1 is the best power saving mechanism. For Voice Call and Video Call, PM1+ Query packet is the best power saving mechanism. For Live Stream and video on demand (VOD), PM2 is the best power saving mechanism. For a 1 GB (for instance) File Download, PM2 is the best power saving mechanism according to one or more embodiments. Each application has a traffic pattern that has a certain traffic periodicity and traffic density in one or more embodiments. For example, traversing from the top of the table towards the bottom of the table, the traffic density of applications within the application column in Table D, is increasing, from sparse to dense in one or more embodiments. The Voice Call and Video Call application each has a periodic pattern, in one or more embodiments. Each application is categorized based on the traffic density and traffic periodicity in one or more embodiments. For example, the Voice Call application has traffic that remains at a rate of about 64 Kbs and receives data periodically, in one or more embodiments. The traffic pattern of Voice Call is categorized as having a traffic pattern that is sparse and periodic, in one or more embodiments. The wireless device checks traffic statistics and periodicity in one or more embodiments, in one or more embodiments, when an application is determined to be reaching 64 Kb/s and periodic, the wireless device sets the power saving mechanism to PM1+ Query Packet #1, for instance.

In one or more embodiments, the wireless device selects a particular power saving mechanism to transition to, if the wireless device's current power saving mechanism is determined to be unsuitable, provide inadequate power saving, or is less efficient than the selected power saving mechanism. The wireless device selects a particular power saving mechanism to transition to (or decides to operate in the current power saving mechanism), according to the determined category/categories or type(s) of traffic and/or the current power saving mechanism.

At operation 610, the wireless device configures the selected power saving mechanism. Upon selecting the power saving mechanism, the wireless device configures one or more parameters for the power saving mechanism according to the traffic density and traffic periodicity. For example, if the first power saving mechanism is selected, the wireless device determines a packet interval of the current traffic and configures a query packet (PS-Poll) interval associated with the first power saving mechanism according to the determined packet interval. In one or more embodiments, the PS-Poll interval is configured as being same as the determined packet interval. In one or more embodiments, the packet interval of the current traffic has a range of time intervals and the PS-Poll interval is configured to have a value within the range of time intervals. If the second power saving mechanism is selected, the wireless device determines a traffic density of the current traffic and configures a TAP associated with the second power saving mechanism according to the determined traffic density. In one or more embodiments, the TAP is selected from within a predetermined range using the traffic density. In one or more embodiments, the wireless device configures a query period to send a query packet to an AP when the wireless device is under one of the first power saving mechanism (e.g., PM1) or the third power saving mechanism (e.g., PM3). In one or more embodiments, if it is determined that packet latency is more important, the wireless device configures a short query period to increase traffic quality (e.g., less jitter, short latency, high TPUT, more robustness). In one or more embodiments, if it is determined that power saving efficiency is more important, the wireless device configures a long query period to send the query packet. In one or more embodiments, these query periods are each configured or selected from within a predetermined query period range. In one or more embodiments, the query period range has a minimum query period of 10 milliseconds (e.g., for balancing between latency and power consumption for a voice call). In one or more embodiments, the query period range has a maximum query period that is determined by the traffic statistics, and is not a fixed value.

Figure 2G:
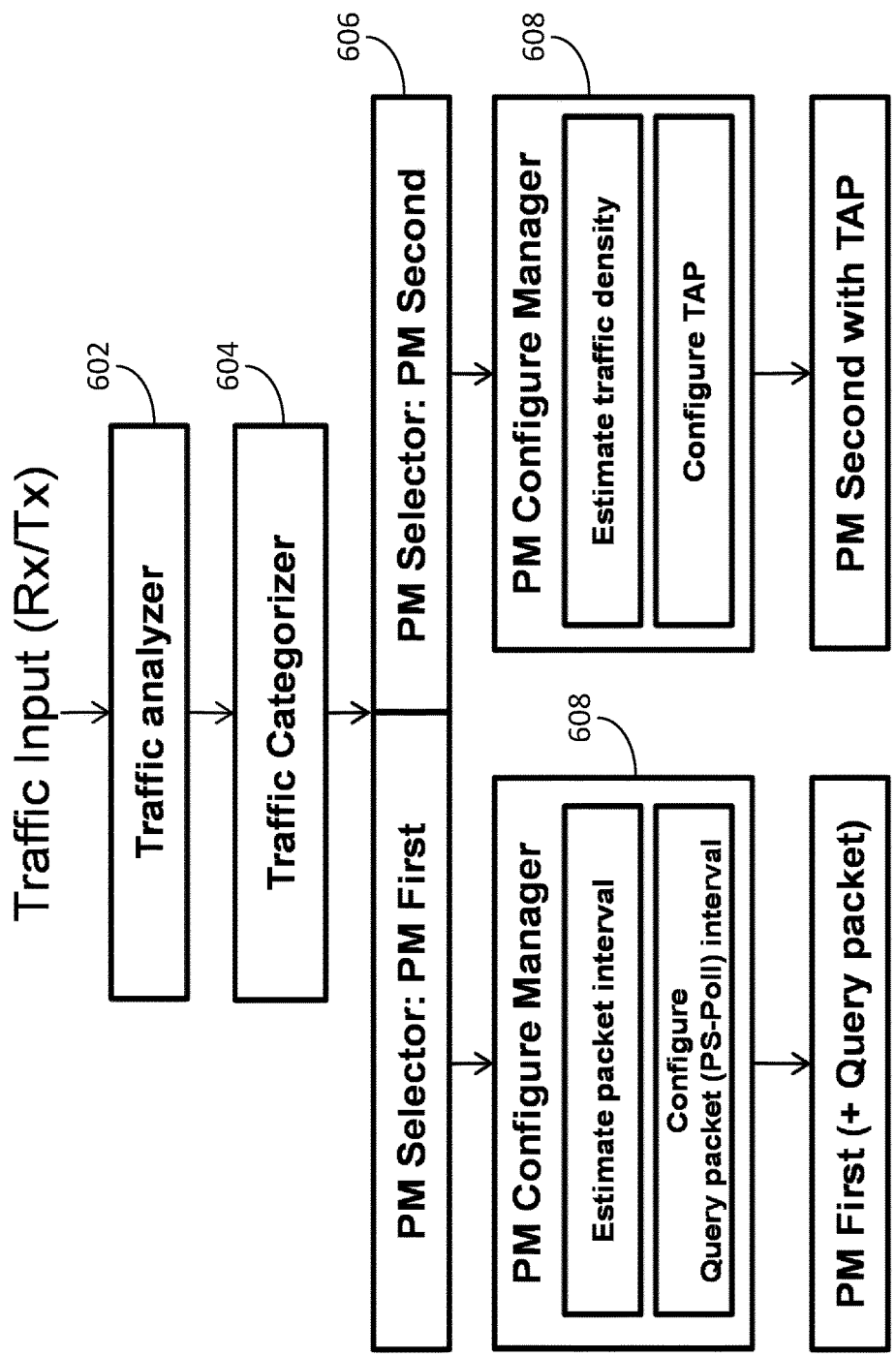
FIG. 2G depicts an example embodiment of a system for providing dynamic power saving.

Referring to FIG. 2G, an example embodiment of a system for providing dynamic power saving is depicted. In one or more embodiments, a system utilized by a wireless device for providing dynamic power saving includes various components, such as a traffic analyzer 602, a traffic categorizer 604, a PM selector 606, and a PM configure manager 608. In one or more embodiments, each component is hardware, software, or combination of hardware and software. In one or more embodiments, the traffic analyzer 602 performs one or more operations described in operation 504 discussed above. In one or more embodiments, the traffic categorizer 604 performs one or more operations described in operation 506 discussed above. In one or more embodiments, the PM selector 606 performs one or more operations described in operation 508 discussed above. In one or more embodiments, the PM configure manager 608 performs one or more operations described in operation 510 discussed above.

Although examples of communications systems described above can include devices and access points operating according to an IEEE 802.11 (WiFi), 3GPP, or 4G (i.e., LTE) standard, it should be understood that embodiments of the systems and methods described can operate according to other standards and use wireless communications devices other than devices implemented as devices and base stations. For example, communication interfaces associated with cellular networks, satellite communications, vehicle communication networks, 802.11 and other non-802.11 wireless networks can utilize the systems and methods described herein to achieve improved overall capacity and/or link quality without departing from the scope of the systems and methods described herein.

It should be noted that certain passages of this disclosure can reference terms such as "first" and "second" in connection with devices, arrays, direction, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method of power management, the method comprising:
   determining, by a wireless device, for each of a plurality of periodic decision periods, whether data traffic of a network satisfies a corresponding periodic decision criteria;
   counting a number of periodic decision periods satisfying the corresponding periodic decision criteria;
   determining, by the wireless device, density and periodicity of the data traffic according to the counted number of periodic decision periods satisfying the corresponding periodic decision criteria;
   generating, by the wireless device, traffic statistics based on the density and the periodicity of the data traffic;
   categorizing, by the wireless device, the data traffic into a first traffic pattern of a plurality of traffic patterns using the generated traffic statistics;
   dynamically selecting, by the wireless device in accordance to the first traffic pattern, one of a plurality of power management mechanisms; and
   configuring the wireless device to use the selected power management mechanism in accordance to the first traffic pattern.

2. The method of claim 1, further comprising transitioning the wireless device from a first power state to a second power state according to the selected power management mechanism.

3. The method of claim 1, wherein generating the traffic statistics comprises generating the traffic statistics using at least one of incoming data to the wireless device or outgoing data from the wireless device.

4. The method of claim 1, wherein the plurality of power management mechanisms comprise a first power management mechanism, under which the wireless device is always in a power saving mode and the wireless device communicates data with the network in the power saving mode.

5. The method of claim 4, wherein the plurality of power management mechanisms comprise a second power management mechanism, under which the wireless device is in the power saving mode when there is no data transmission and switches to an active mode when the wireless device communicates data with the network.

6. The method of claim 5, wherein the plurality of power management mechanisms comprise a third power management mechanism, under which the wireless device switches between a doze state and an awake state periodically, a switching period determined by negotiating an awake period and a service period, wherein the wireless device switches to the awake state when the wireless device is triggered by a trigger frame indicating that an exchange packet exists, and enters the doze state after the service period.

7. The method of claim 4, wherein configuring the selected power management mechanism comprises determining a packet interval and configuring a period for sending a query packet using the determined packet interval when the selected power management mechanism is the first power management mechanism.

8. The method of claim 6, further comprising:
determining a current power management mechanism of the wireless device;
monitoring the data traffic during a period of time by determining a traffic density during the period of time;
when the current power management mechanism is the first power management mechanism:
determining a traffic periodicity of the wireless device during the period of time;
switching the wireless device from the first power management mechanism to the second power management mechanism according to the determined traffic periodicity; and
determining whether the traffic density of the wireless device exceeds a first density threshold;
in response to determining that the traffic density exceeds the first density threshold, switching the wireless device from the second power management mechanism to the third power management mechanism; and
when the wireless device is in the third power management mechanism:
determining whether the traffic density is below a second density threshold; and
in response to determining that the traffic density is below the second density threshold, switching the wireless device from the third power management mechanism to the first power management mechanism.

9. The method of claim 4, further comprising:
determining a current power management mechanism of the wireless device;
monitoring the data traffic of the wireless device during a period of time by determining a traffic density during the period of time;
when the current power management mechanism is a third power management mechanism:
determining a traffic periodicity of the wireless device during the period of time;
determining whether the traffic density is below a second density threshold; and
in response to determining that the traffic density is below the second density threshold and the data traffic is periodic, switching the wireless device from the third power management mechanism to a second power management mechanism according to the traffic periodicity; and
when the wireless device is in the first power management mechanism:
determining whether the traffic density exceeds a first density threshold; and
in response to determining the data traffic is not periodic or determining the traffic density exceeds the first density threshold, switching from the second power management mechanism to the third power management mechanism.

10. A system for power management, the system comprising:
one or more processors configured to:
determine, for each of a plurality of periodic decision periods, whether data traffic of a network satisfies a corresponding periodic decision criteria;
count a number of periodic decision periods satisfying the corresponding periodic decision criteria;
determine density and periodicity of the data traffic according to the counted number of periodic decision periods satisfying the corresponding periodic decision criteria;
generate traffic statistics based on the density and the periodicity of the data traffic;
categorize the data traffic into a first traffic pattern of a plurality of traffic patterns using the generated traffic statistics;
dynamically select one of a plurality of power management mechanisms in accordance to the first traffic pattern; and
apply the selected power management mechanism in accordance to the first traffic pattern.

11. The system of claim 10, wherein the plurality of power management mechanisms comprise a first power management mechanism, under which a wireless device is always in a power saving mode and the wireless device communicates data with the network in the power saving mode.

12. The system of claim 11, wherein the plurality of power management mechanisms comprise a second power management mechanism, under which the wireless device is in the power saving mode when there is no data transmission and switches to an active mode when the wireless device communicates data with the network.

13. The system of claim 12, wherein the plurality of power management mechanisms comprise a third power management mechanism, under which the wireless device switches between a doze state and an awake state periodically, a switching period determined by negotiating an awake period and a service period, wherein the wireless device switches to the awake state when the wireless device is triggered by a trigger frame indicating that an exchange packet exists, and enters the doze state after the service period.

14. The system of claim 13, wherein the plurality of power management mechanisms comprise a fourth power management mechanism, under which the wireless device switches between the doze state and the awake state periodically, the switching period determined by negotiating a target awake period and a wakeup interval.

15. The system of claim 11, wherein applying the selected power management mechanism comprises determining a packet interval and configuring a period for sending a query packet using the determined packet interval when the selected power management mechanism is the first power management mechanism.

16. The system of claim 10, wherein applying the selected power management mechanism comprises configuring a traffic absence period (TAP) monitoring time using the determined density of the data traffic.

17. An apparatus for conducting network communications, comprising:
one or more processors configured to:
determine, for each of a plurality of periodic decision periods, whether data traffic of a network satisfies a corresponding periodic decision criteria;
count a number of periodic decision periods satisfying the corresponding periodic decision criteria;
determine density and periodicity of the data traffic according to the counted number of periodic decision periods satisfying the corresponding periodic decision criteria;
generate traffic statistics based on the density and the periodicity of the data traffic;
categorize the data traffic into a first traffic pattern of a plurality of traffic patterns using the generated traffic statistics; and
dynamically select one of a plurality of predefined power management mechanisms in accordance to the first traffic pattern, and apply the selected power management mechanism.

18. The apparatus of claim 17, wherein the one or more processors are configured to count the number of periodic decision periods satisfying the corresponding periodic decision criteria from a subset of continuous periodic decision periods of the plurality of periodic decision periods.

19. The apparatus of claim 17, wherein the one or more processors are configured to:
count another number of periodic decision periods satisfying the corresponding periodic decision criteria from a subset of the plurality of periodic decision periods;
compare the another counted number with a threshold value;
count the number of periodic decision periods satisfying the corresponding periodic decision criteria from another subset of the plurality of periodic decision periods, in response to the another counted number being below the threshold value;
compare the counted number of periodic decision periods with the threshold value; and
determine the density and the periodicity of the data traffic according to the counted number of periodic decision periods satisfying the corresponding periodic decision criteria, in response to the counted number of periodic decision periods satisfying the threshold value.

20. The apparatus of claim 19, wherein the subset of the plurality of periodic decision periods partially overlaps with the another subset of the plurality of periodic decision periods.

* * * * *